(12) United States Patent
Li et al.

(10) Patent No.: US 11,483,281 B2
(45) Date of Patent: Oct. 25, 2022

(54) APPARATUS AND METHOD FOR ESTABLISHING AND MAINTAINING A DS-LITE TUNNEL

(71) Applicant: ARRIS Enterprises LLC, Suwanee, GA (US)

(72) Inventors: Ju Li, Shenzhen (CN); Lijie Niu, Shenzhen (CN); Haiqiang Wang, Shenzhen (CN); Xin Wang, Shenzhen (CN); Haijuan Wen, Shenzhen (CN); He Xiao, Shenzhen (CN)

(73) Assignee: ARRIS ENTERPRISES LLC, Suwanee, GA (US)

( * ) Notice: Subject to any disclaimer, the term of this patent is extended or adjusted under 35 U.S.C. 154(b) by 0 days.

(21) Appl. No.: 17/280,561

(22) PCT Filed: Mar. 27, 2020

(86) PCT No.: PCT/CN2020/081656
§ 371 (c)(1),
(2) Date: Mar. 26, 2021

(87) PCT Pub. No.: WO2021/189415
PCT Pub. Date: Sep. 30, 2021

(65) Prior Publication Data
US 2022/0116350 A1    Apr. 14, 2022

(51) Int. Cl.
*H04L 61/4511*    (2022.01)
*H04L 12/46*    (2006.01)
(Continued)

(52) U.S. Cl.
CPC .......... *H04L 61/4511* (2022.05); *H04L 12/46* (2013.01); *H04L 61/5014* (2022.05); *H04L 67/145* (2013.01); *H04L 2101/686* (2022.05)

(58) Field of Classification Search
CPC . H04L 12/46; H04L 61/1511; H04L 61/2015; H04L 61/6086; H04L 67/145
(Continued)

(56) References Cited

U.S. PATENT DOCUMENTS 9,461,868 B2 * 10/2016 Sarikaya ............... H04L 45/741
2009/0287812 A1 * 11/2009 Weber ................ H04L 12/2805
709/224
(Continued)

FOREIGN PATENT DOCUMENTS

CN    102546362 A  *  7/2012  ......... H04L 12/2812
CN    105592057       5/2016
(Continued)

OTHER PUBLICATIONS

Durand et al., RFC 6333—Dual-Stack Lite Broadband Deployments Following IPv4 Exhaustion, Internet Engineering Task Force (IETF), pp. 1-32 (Aug. 2011) (Year: 2011).*
(Continued)

*Primary Examiner* — David P Zarka
(74) *Attorney, Agent, or Firm* — Wenderoth, Lind & Ponack, L.L.P.

(57) ABSTRACT

An electronic apparatus for establishing a Dual-Stack Lite (DS-lite) tunnel is provided. The apparatus sends a request for an Internet Protocol (IP) address of a Domain Name System (DNS) server and a domain name of an Address Family Transition Router (AFTR) server to a Dynamic Host Configuration Protocol (DHCP) server using an IP address of the DHCP server, receives the IP address of the DNS server and the domain name of the AFTR server from the DHCP server in response to the request, sends a DNS query including the domain name of the AFTR server to the DNS server using the IP address of the DNS server. In response to the DNS query being successful, the apparatus receives an
(Continued)

IP address of the AFTR server from the DNS server, and establishes the DS-lite tunnel between the apparatus and the AFTR server using the IP address of the AFTR server.

20 Claims, 5 Drawing Sheets

(51) Int. Cl.
    *H04L 67/145*     (2022.01)
    *H04L 61/5014*     (2022.01)
    *H04L 101/686*     (2022.01)

(58) Field of Classification Search
    USPC .......................................................... 709/224
    See application file for complete search history.

(56) References Cited

U.S. PATENT DOCUMENTS

| | | | | |
|---|---|---|---|---|
| 2010/0332680 | A1* | 12/2010 | Anderson | H04L 61/1511 709/245 |
| 2011/0307629 | A1* | 12/2011 | Haddad | H04L 29/12358 709/245 |
| 2013/0114463 | A1* | 5/2013 | Li | H04W 48/18 370/254 |
| 2013/0204978 | A1* | 8/2013 | Fleischman | H04L 61/1511 709/219 |
| 2013/0212299 | A1* | 8/2013 | Grundemann | H04L 61/2546 709/245 |
| 2013/0229922 | A1* | 9/2013 | Li | H04L 41/0659 370/242 |
| 2015/0222734 | A1* | 8/2015 | Inada | H04L 12/4633 370/315 |
| 2020/0204984 | A1* | 6/2020 | Dodd-Noble | H04W 8/08 |
| 2020/0396200 | A1* | 12/2020 | Kumar | H04L 61/1511 |
| 2021/0099420 | A1* | 4/2021 | Zhang | H04L 12/66 |

FOREIGN PATENT DOCUMENTS

| | | | | |
|---|---|---|---|---|
| CN | 105592057 | A * | 5/2016 | ......... H04L 12/4633 |
| CN | 107995113 | | 5/2018 | |
| CN | 107995113 | A * | 5/2018 | ............. H04L 45/50 |
| EP | 3886404 | A1 * | 9/2021 | .......... H04L 61/1511 |
| JP | 2012175320 | A * | 9/2012 | |

OTHER PUBLICATIONS

Hankins et al., RFC 6334—Dynamic Host Configuration Protocol for IPv6 (DHCPv6) Option for Dual-Stack Lite, Internet Engineering Task Force (IETF), pp. 1-7 (Aug. 2011) (Year: 2011).*
Google English translation for CN 105592057, available at https://patentscope.wipo.int/search/en/detail.jsf?docId=CN174036586 (Year: 2015).*
International Search Report and Written Opinion of the International Searching Authority dated Dec. 30, 2020, in International (PCT) Application No. PCT/CN2020/081656.

* cited by examiner

APPARATUS AND METHOD FOR ESTABLISHING AND MAINTAINING A DS-LITE TUNNEL

BACKGROUND

Electronic communication on the Internet is performed according to Internet Protocol (IP). IP addresses are used to identify electronic devices within a network environment. Internet Protocol version 4 (IPv4) is the fourth iteration of the Internet Protocol, and uses a 32-bit address scheme. However, IPv4 address resources are limited, and with the growth of the Internet and increasing numbers of devices it is expected that the number of unused IPv4 addresses will eventually run out. Internet Protocol version 6 (IPv6) was created to solve this problem. By using a 128-bit address scheme, IPv6 fulfills the need for more IP addresses. However, providing IPv6 addresses alone is often not workable because most of the systems that make up the public Internet are still enabled and support only IPv4, and many user's client devices do not yet fully support IPv6. Accordingly, during the transition from IPv4 to IPv6, service providers must continue to support both versions.

Dual-Stack Lite (DS-lite) is a solution that has evolved from IPv4 to IPv6. DS-lite allows service providers with IPv6 infrastructure to migrate to an IPv6 access network without changing end user software, and connect their IPv4 subscribers to the Internet. Without DS-lite, a gateway device must have at least one IPv4 address and one IPv6 address in order to provide client devices in the local network of the gateway device with IPv4/IPv6 dual-stack routing, for example. If DS-lite is used, however, the gateway device can provide the client devices with IPv4/IPv6 dual-stack routing while having only an IPv6 address. Thus, a gateway device equipped with DS-lite technology can greatly save IPv4 address resources. DS-lite uses IPv4-in-IPv6 tunneling to send a subscriber's IPv4 packet through a tunnel on the IPv6 access network to the service provider. The IPv6 packet is decapsulated to recover the subscriber's IPv4 packet and is then sent to the Internet. The response packets traverse through the same path back to the subscriber.

For a gateway device that has DS-lite technology enabled, users can access the Internet using their client devices through the gateway device via either IPv4 or IPv6. However, if DS-lite fails, some client devices using an IPv4 address will lose Internet access. For example, the user's laptop computer, desktop computer, smartphone, tablet, etc. may be unable to browse websites or connect to external networks. Complaints from users without Internet access are a serious problem from multiple system operators (MSOs) and Internet service providers (ISPs).

SUMMARY

Thus, it is important to keep the DS-lite function of gateway devices operating stably. Accordingly, there is a need to provide an apparatus and method for establishing and maintaining a DS-lite tunnel that can avoid failure of DS-lite functionality.

According to some example embodiments of inventive concepts described herein, an electronic apparatus for establishing a DS-lite tunnel is provided. The electronic apparatus includes a memory storing computer-readable instructions, and a processor configured to execute the computer-readable instructions to send a request for an Internet Protocol (IP) address of a Domain Name System (DNS) server and a domain name of an Address Family Transition Router (AFTR) server to a Dynamic Host Configuration Protocol (DHCP) server using an IP address of the DHCP server, receive the IP address of the DNS server and the domain name of the AFTR server from the DHCP server in response to the request, and send a DNS query to the DNS server using the IP address of the DNS server, wherein the DNS query includes the domain name of the AFTR server. In response to the DNS query being successful, the processor of the electronic apparatus is further configured to execute the computer-readable instructions to receive an IP address of the AFTR server from the DNS server, and establish the DS-lite tunnel between the gateway device and the AFTR server using the IP address of the AFTR server.

In some example embodiments, in response to failure of the DNS query, the processor of the electronic apparatus is further configured to execute the computer-readable instructions to establish the DS-lite tunnel between the electronic apparatus and the AFTR server using a predetermined IP address. The predetermined IP address is stored in the memory based on one of a default configuration of the electronic apparatus, an initial setting by a user of the electronic apparatus, or a previous successful DNS query.

In some example embodiments, the processor of the electronic apparatus is further configured to execute the computer-readable instructions to save the IP address of the AFTR server in the memory of the electronic apparatus in response to the DNS query being successful.

In some example embodiments, the processor of the electronic apparatus is further configured to execute the computer-readable instructions to maintain the DS-lite tunnel between the electronic apparatus and the AFTR server using the saved IP address of the AFTR server that is stored in the memory of the electronic apparatus in response to the DNS query being successful.

In some example embodiments, the processor of the electronic apparatus is further configured to execute the computer-readable instructions to periodically transmit subsequent DNS queries to the DNS server based on a DNS time to live (TTL) timer.

In some example embodiments, in response to one of the subsequent DNS queries being successful, the processor of the electronic apparatus is further configured to execute the computer-readable instructions to receive a subsequent IP address of the AFTR server from the DNS server, maintain the DS-lite tunnel between the electronic apparatus and the AFTR server using the subsequent IP address of the AFTR server, and update the memory of the electronic apparatus with the subsequent IP address of the AFTR server.

In some example embodiments, in response to failure of one of the subsequent DNS queries, the processor of the electronic apparatus is further configured to execute the computer-readable instructions to retrieve the saved IP address or the subsequent IP address of the AFTR server that is stored in the memory of the electronic apparatus in response to the DNS query or one of the subsequent DNS queries being successful, and maintain the DS-lite tunnel between the gateway device and the AFTR server using the retrieved IP address of the AFTR server.

According to some other example embodiments of inventive concepts described herein, a method for establishing a Dual-Stack Lite (DS-lite) tunnel is provided. The method may include sending a request for an Internet Protocol (IP) address of a Domain Name System (DNS) server and a domain name of an Address Family Transition Router (AFTR) server to a Dynamic Host Configuration Protocol (DHCP) server using an IP address of the DHCP server, receiving the IP address of the DNS server and the domain name of the AFTR server from the DHCP server in response to the request, and sending a DNS query to the DNS server using the IP address of the DNS server, wherein the DNS query includes the domain name of the AFTR server. In response to the DNS query being successful, the method further includes receiving an IP address of the AFTR server from the DNS server, and establishing the DS-lite tunnel between the gateway device and the AFTR server using the IP address of the AFTR server.

In some example embodiments, in response to failure of the DNS query, the method further includes establishing the DS-lite tunnel between the gateway device and the AFTR server using a predetermined IP address that is stored in a memory of the gateway device.

In some example embodiments, the predetermined IP address is stored in the memory of the gateway device based on one of a default configuration of the gateway device, an initial setting by a user, or a previous successful DNS query.

In some example embodiments, the method further includes saving the IP address of the AFTR server in a memory of the gateway device in response to the DNS query being successful.

In some example embodiments, the method further includes maintaining the DS-lite tunnel between the gateway device and the AFTR server using the saved IP address of the AFTR server that is stored in the memory of the gateway device in response to the DNS query being successful.

In some example embodiments, the method further includes periodically transmitting subsequent DNS queries to the DNS server based on a DNS time to live (TTL) timer.

In some example embodiments, in response to one of the subsequent DNS queries being successful, the method further includes receiving a subsequent IP address of the AFTR server from the DNS server, maintaining the DS-lite tunnel between the gateway device and the AFTR server using the subsequent IP address of the AFTR server, and updating the memory of the gateway device with the subsequent IP address of the AFTR server.

In some example embodiments, in response to failure of one of the subsequent DNS queries, the method further includes retrieving the saved IP address or the subsequent IP address of the AFTR server that is stored in the memory of the gateway device in response to the DNS query or one of the subsequent DNS queries being successful, and maintaining the DS-lite tunnel between the gateway device and the AFTR server using the retrieved IP address of the AFTR server.

According to yet some other example embodiments of inventive concepts described herein, a non-transitory computer-readable medium storing a software program for establishing a DS-lite tunnel is provided. The software program, when executed by a processor of the above-described electronic apparatus, causes the electronic apparatus to perform the above-described method for establishing the DS-lite tunnel, for example.

Thus, according to various example embodiments of inventive concepts disclosed herein, it is possible to establish and maintain a DS-lite tunnel between a gateway device and an AFTR server, even in the event of a failure of a DNS query, using mechanism that employs a predetermined IP address or a saved IP address to ensure that the DS-lite technology keeps working when a DNS query fails.

DETAILED DESCRIPTION

For simplicity and illustrative purposes, the principles of the embodiments are described by referring mainly to examples thereof. In the following description, numerous specific details are set forth in order to provide a thorough understanding of some example embodiments. It will be apparent however, to one of ordinary skill in the art, that some other example embodiments may be practiced without limitation to these specific details. In some instances, well known methods and structures have not been described in detail so as not to unnecessarily obscure the example embodiments.

Figure 1:
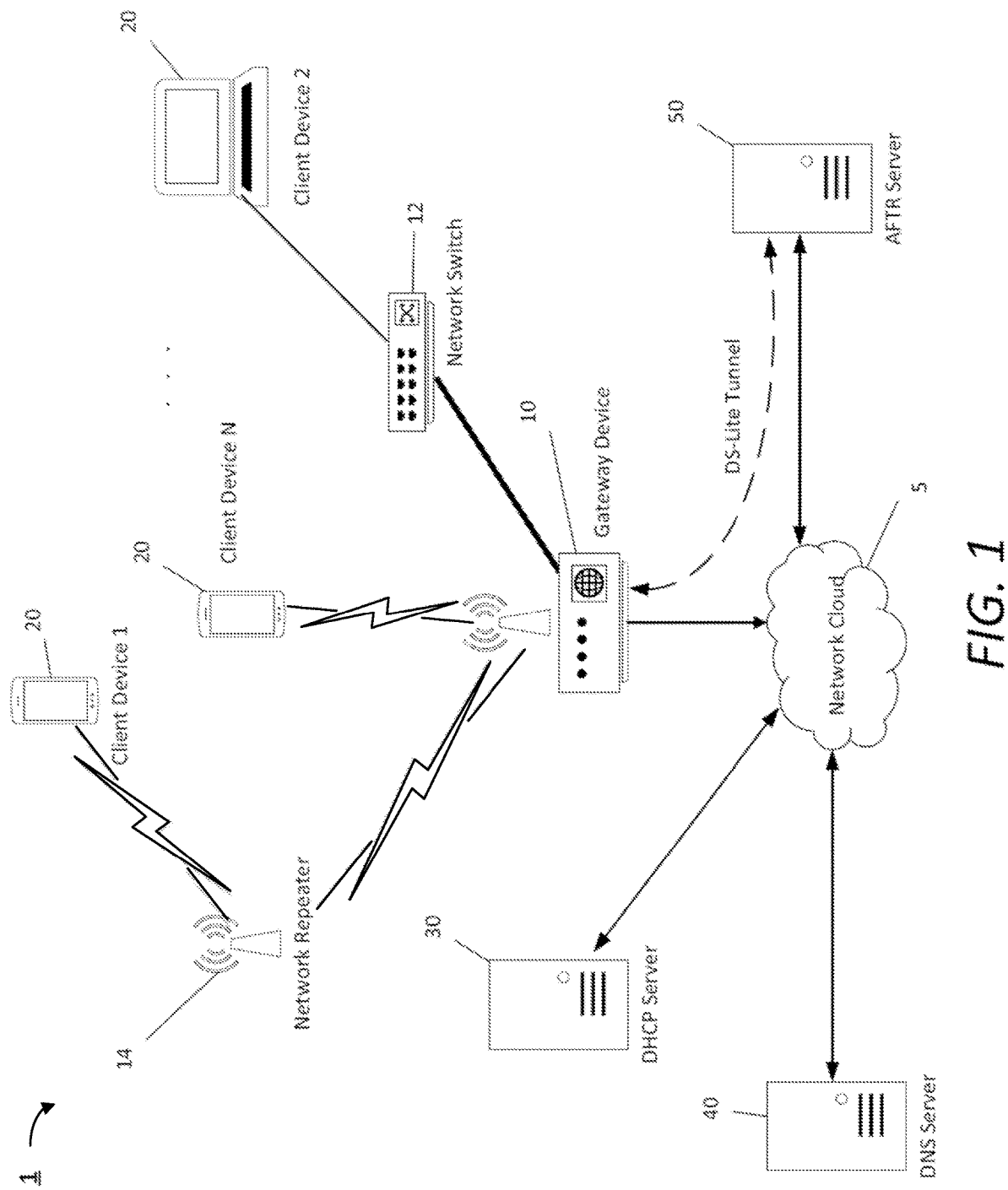
FIG. 1 is an architecture diagram of an example of a network including a plurality of electronic apparatuses, according to some example embodiments.

FIG. 1 is an architecture diagram of an example of a network including a plurality of electronic apparatuses, according to some example embodiments.

As shown in FIG. 1, a possible implementation of a network 1 may include a network cloud 5, a gateway device 10, a plurality of client devices 20 (e.g., client device 1, client device 2, [. . . ], client device N), a DHCP server 30, a DNS server 40, and an AFTR server 50, for example. The local network of the gateway device 10 may also include a network switch 12 (e.g., providing wired connections) and a network repeater 14 (e.g., a wireless extender), although such devices may not be present according to some other example embodiments. It should be appreciated that various example embodiments of inventive concepts disclosed herein are not limited to one of each device and there may be multiple or many of one or more of the aforementioned electronic apparatuses in the network 1, which may itself consist of multiple communication networks and various known or future developed wired and/or wireless connectivity technologies, protocols, devices, and the like.

The gateway device 10 is an electronic device that provides network access between local area network (LAN) hosts to a wide area network (WAN) via a modem. The modem may or may not be integrated directly into the hardware of the gateway device 10 according to various example embodiments. The WAN is a larger external computer network, general operated by an internet service provider (ISP) or multiple system operator (MSO), also referred to generally as the Internet. For example, the gateway device 10 may provide routing between client devices 20 in the LAN and the Internet, wired and wireless connectivity within the LAN, network address translation (NAT) for IPv4, DHCP for IPv4 and router advertisements for IPv6, among many other functions. The gateway device 10 may be referred to as a residential gateway, a home gateway, a router, a modem, an access point, or the like. As shown in FIG. 1, the gateway device 10 may communicate with the DHCP server 30, the DNS server 40, and/or the AFTR server 50 via the network cloud 5.

The plurality of client devices 20 may be any of a wide variety of user devices, including but not limited to, laptop computers, desktop computers, tablets, smartphones, Internet of Things (IoT) devices, televisions, set-top boxes, media hubs, Bluetooth devices, and the like. The gateway device 10 may provide wired and/or wireless connectivity to the client devices 20 to enable access to an external network, such as a wide area network (WAN), the Internet, etc. Some of the client devices 20 may be able to use both IPv4 addresses and IPv6 addresses. However, some other client devices 20 may use IPv4 addresses only.

The Dynamic Host Configuration Protocol (DHCP) server 30 is a network server that dynamically assigns IP addresses, default gateways, and other network configuration parameters to client devices 20 automatically, via the gateway device 10. A centralized dual-protocol DHCP server 30 can provide both IPv4 addresses and IPv6 addresses to client devices 20.

The Domain Name Server (DNS server) 40 is used to translate a domain name to an Internet Protocol (IP) address for the further route in the Internet. For example, when a user of a client device 20 needs to access a web site, the user will input the domain name of the web site in a web browser, and the web browser will send a DNS request to the DNS server 40 to translate the input website name to an IP address. Then, the web browser of the client device 20 can access the website with this IP address.

In order to provide Internet access to the client devices 20 with only IPv4 address capability, the gateway device 10 may set up a Dual-Stack Lite (DS-lite) tunnel with an Address Family Transition Router (AFTR) server 50. The essence of DS-lite technology is to deploy an IPv4-in-IPv6 tunnel over an IPv6 network for IPv4 service transmission. For DS-lite service, the gateway device 10 will setup a tunnel with the AFTR server 50 to transmit the IPv4-in-IPv6 packets. The AFTR server 50 acts as an IPv4 over IPv6 tunnel endpoint. In the upstream direction, the AFTR server 50 is responsible for removing IPv6 headers of packets received from the gateway device 10 (e.g., request packets) through the DS-lite tunnel, and then sending them to the Internet. In the downstream direction, the AFTR server 50 is responsible for encapsulating IPv6 headers of the packets received from the destination IPv4 host (e.g., reply packets), and sending them to the gateway device 10 through the DS-lite tunnel.

Figure 2:
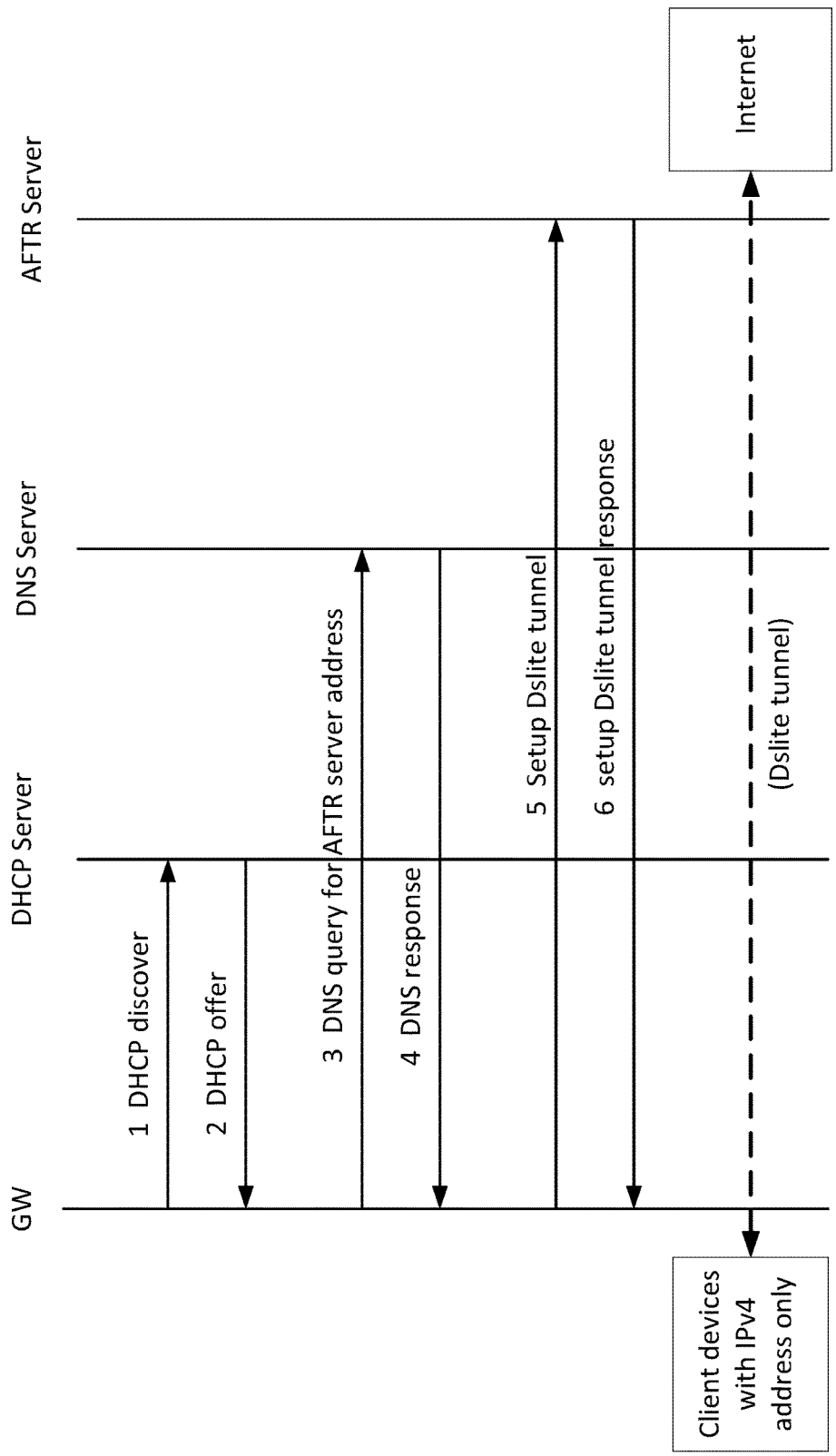
FIG. 2 is a diagram showing a flow of communications for establishing a DS-lite tunnel between a gateway device and an AFTR server.

FIG. 2 is a diagram showing a flow of communications for establishing a DS-lite tunnel between a gateway device and an AFTR server. For example, a gateway device 10 may communicate with a DHCP server 30, a DNS server 40, and an AFTR server 50, as described above in connection with FIG. 1.

As shown in FIG. 2, a method for establishing a DS-lite tunnel between a gateway device and an AFTR server involves a series a communications exchanged between a gateway device, a DHCP server, a DNS server, and a AFTR server, including at least:
1. Message 1 ("DHCP discover") includes a DHCP option 6 to request an IP address of a DNS server, and DHCP option 64 to request a domain name of an AFTR server.
2. Message 2 ("DHCP offer") includes the IP address of the DNS server, and the domain name of the AFTR server.
3. Message 3 ("DNS query for AFTR server address") includes the domain name of the AFTR server.
4. Message 4 ("DNS response") includes the IP address of the AFTR server.
5. Message 5 ("Setup DSlite tunnel) is sent by the gateway device to the AFTR server using the IP address of the AFTR server.
6. Message 6 ("setup DSlite tunnel response") is received by the gateway device from the AFTR server.

Once the gateway device receives the "setup DSlite tunnel response" from the AFTR server, the gateway device can establish the DS-lite tunnel between the gateway device and the AFTR server, and provide access to an external network (the Internet) to client devices (e.g., user devices with IPv4 addresses only) in the local area network (LAN) of the gateway device via the DS-lite tunnel and the AFTR server.

Additionally, the gateway device can maintain the DS-lite tunnel between the gateway device and the AFTR server. For example, the gateway device may periodically send subsequent DNS queries to the DNS server, and receive subsequent IP addresses of the AFTR server from the DNS server.

However, a problem exists in a known gateway device and related method for establishing and maintaining a DS-lite tunnel. If the known gateway device does not receive a reply (no Message 4—"DNS response") from the DNS server in response to the DNS query, then the known gateway device will not be able to establish the DS-lite tunnel between the gateway device and the AFTR server according to the related method. Similarly, if the known gateway device does not receive a reply (DNS response) from the DNS server in response to one of the subsequent DNS queries, then the known gateway device will not be able to maintain the DS-lite tunnel between the known gateway device and the AFTR server according to the related method. For example, a gateway device starting an IPv6 connection slowly may cause the first IPv6 DNS query to fail. Other reasons why a DNS query might fail include, but are not limited to, a dropped connection, congestion on the network, low signal strength, interference, packets arriving out of sequence, and numerous other problems that can occur within specific network environments.

In either case, the absence of receiving the reply ("DNS response") from the DNS server in response to a DNS query results in a failure of the DNS query, and the process for establishing the DS-lite tunnel terminates, or in the case of maintaining the DS-lite tunnel the DS-lite tunnel is terminated (e.g., deleted, demolished, destroyed, etc.). If the DS-lite tunnel is terminated upon failure of a DNS query, the known gateway device may not be configured to retry the DNS request, and/or may not be configured to restart the process from the beginning, in which case the known gateway device will do nothing in response to the failure of the DNS query according to the related method. When the DS-lite tunnel is destroyed upon failure of the DNS query, this results in an "IPv4 datapath fail," which is a serious issue. As a result, the users of client devices having only IPv4 addresses will not be able to access the Internet (e.g., websites, external networks, or the like) via the known gateway device and related method.

Accordingly, there is a need for an improved method and apparatus for avoiding failure of the DS-lite function and keeping a DS-lite tunnel between a gateway device and an AFTR server operating stably in response to a failed DNS query.

Figure 3:
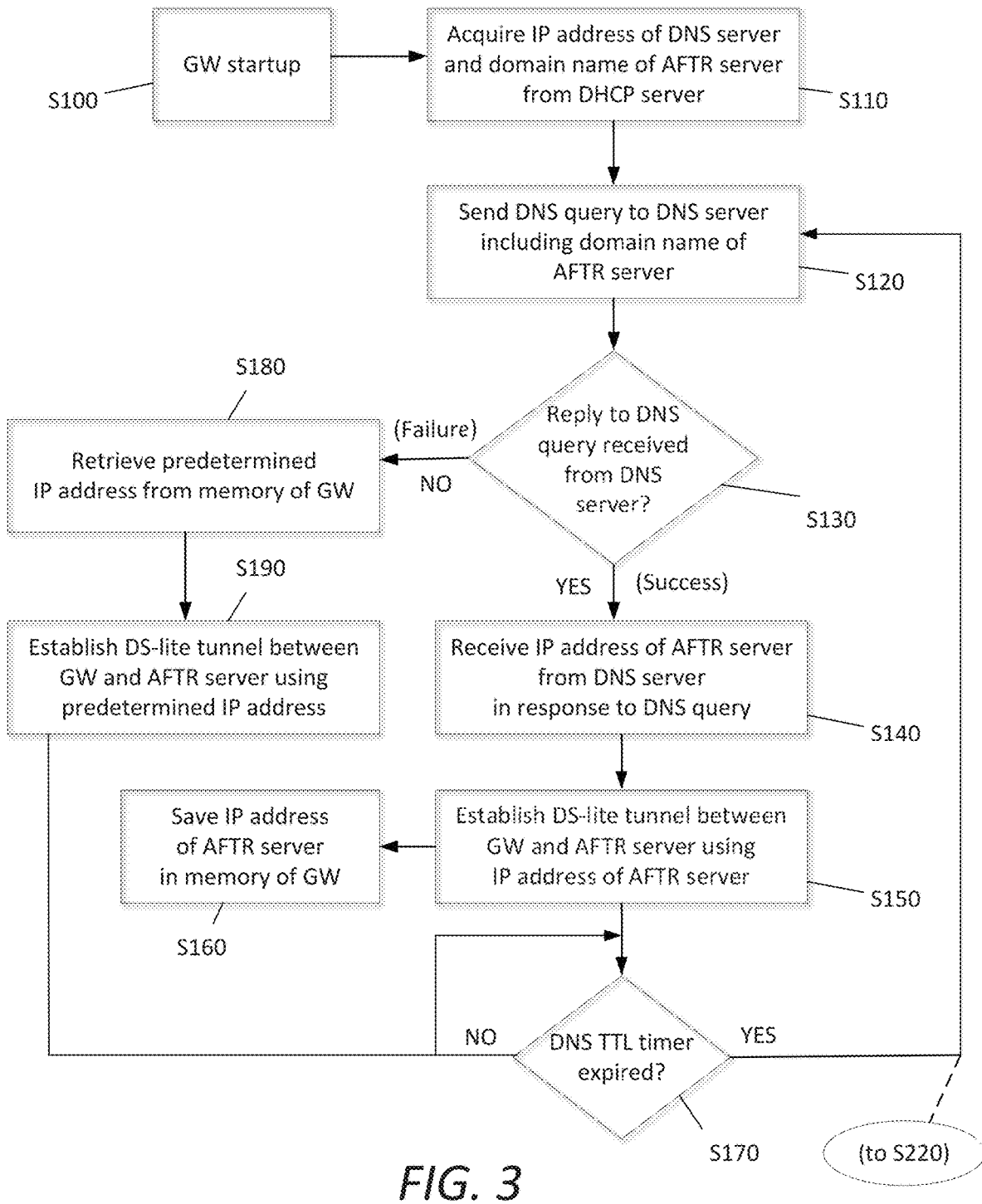
FIG. 3 is a flow chart of a method for establishing a DS-lite tunnel between a gateway device and an AFTR server, according to some example embodiments.

FIG. 3 is a flow chart of a method for establishing a DS-lite tunnel between a gateway device and an AFTR server, according to some example embodiments.

The method of FIG. 3 may be performed by the gateway device 10 of FIG. 1, for example. The gateway device 10 may include processing circuitry for implementing the algorithm for establishing the DS-lite tunnel between the gateway device 10 and the AFTR server 50. For example, the gateway device 10 may include a memory device storing software in the form of computer-readable instructions and a processor configured to execute the software. The gateway device 10 may also store data (e.g., IP addresses) in the memory device or in a separate memory, for use during the process. Thus, the gateway device 10 may include a combination of hardware and software programmed to establish the DS-lite tunnel.

At step S100, the gateway device 10 starts up. At GW startup, the gateway device 10 knows an IP address of a DHCP server 30. For example, the IP address of the DHCP server 30 may be pre-configured or stored in the memory of the gateway device 10 from a previous communication session.

At step S110, the gateway device 10 acquires an IP address of the DNS server 40 and a domain name of the AFTR server 50 from the DHCP server 30. The gateway device 10 connects with the DHCP server 30 using the IP address of the DHCP server 30. The gateway device 10 sends a request ("DHCP discover") to the DHCP server 30, including a request for an IP address of a DNS server 40 (e.g., via DHCP option 6) and a domain name of an AFTR server 50 (e.g., via DHCP option 64). In response to the DHCP request, the gateway device 10 receives a reply ("DHCP offer") from the DHCP server 30, including the IP address of the DNS server 40 and the domain name of the AFTR server 50.

At step S120, the gateway device 10 sends a DNS query to the DNS server 40, including the domain name of the AFTR server 50. The gateway device 10 connects with the DNS server 40 using the IP address of the DNS server 40 that the gateway device 10 received from the DHCP server 30 (at step S110). The gateway device 10 sends the DNS query ("DNS query for AFTR server address") to the DNS server 40, including a request for the IP address of the AFTR server 50.

At step S130, the gateway device 10 determines whether a reply to the DNS query was received from the DNS server 40. If a reply to the DNS query ("DNS response") was received from the DNS server 40 ("YES" at step S130), the DNS query was successful, and the method proceeds to step S140.

At step S140, the gateway device 10 receives the IP address of the AFTR server 50, which is included in the reply to the DNS query ("DNS response") that the gateway device 10 received from the DNS server 40.

At step S150, the gateway device 10 establishes a DS-lite tunnel between the gateway device 10 and the AFTR server 50. The gateway device 10 connects with the AFTR server 50 using the IP address of the AFTR server 50 that the gateway device 10 received from the DNS server 40 (at step S140), and sends a request to establish the DS-lite tunnel ("setup DSlite tunnel") to the AFTR server 50. In response to the request, the gateway device 10 receives a reply ("setup DSlite tunnel response") from the AFTR server 50, and establishes the DS-lite tunnel between the gateway device 10 and the AFTR server 50.

As discussed above, the gateway device 10 can then provide the client devices 20 (e.g., user devices with IPv4 addresses only) with access to an external network (the Internet), via the DS-lite tunnel that has been established between the gateway device 10 and the AFTR server 50 using the IP address of the AFTR server 50.

According to some example embodiments, the gateway device 10 saves the IP address of the AFTR server 50 in the memory of the gateway device 10, at step S160.

Once the DS-lite tunnel is established, the gateway device 10 can maintain the DS-lite tunnel with the AFTR server 50. For example, the gateway device 10 may periodically send subsequent DNS queries for subsequent IP addresses of the AFTR server 50 to the DNS server 40, based on a DNS time to live (TTL) timer. At step S170, the gateway device 10 determines whether the DNS TTL timer has elapsed ("DNS TTL timer expired?"). If the DNS TTL timer has not yet elapsed ("NO" at step S170), then the method returns to step S170 (e.g., after some delay or the like). If the DNS TTL timer has elapsed, then the method returns to step S120 to send a subsequent DNS query to the DNS server 40 (also refer to step S220 of FIG. 4). Details regarding the subsequent DNS query will be discussed below with reference to FIG. 4.

Now referring back to step S130, if the gateway device 10 determines that a reply to the DNS query ("DNS response") was not received from the DNS server 40 ("NO" at step S130), then the DNS query failed. As discussed above, the related method performed by the known gateway device would ordinarily end at this point, without establishing a DS-lite tunnel in the event of failure of the DNS query (e.g., "IPv4 datapath fail"), and the client devices having only IPv4 addresses would be unable to access the Internet. However, in the event that the gateway device 10 according to some example embodiments does not receive a reply to the DNS query from the DNS server 40, then the method according to some example embodiments of inventive concepts disclosed herein does not end, and instead proceeds to step S180.

At step S180, the gateway device 10 retrieves a predetermined IP address from the memory of the gateway device 10. The predetermined IP address may be stored in the memory of the gateway device 10 based on a default configuration of the gateway device 10, an initial setting by a user (e.g., a customer, a technician, a network administrator, etc.), or a previous successful DNS query, according to some example embodiments. For example, the predetermined IP address may be a user pre-set using Management Information Base (MIB). An MSO can use Simple Network Management Protocol (SNMP) to manage user modems and gateways remotely. Most of the modem and gateway configuration information is saved in MIB and can be accessed and set remotely via SNMP. Alternatively, the predetermined IP address may be saved in the memory of the gateway device 10 in response to a previous successful DNS query, for example.

At step S190, the gateway device 10 establishes the DS-lite tunnel between the gateway device 10 and the AFTR server 50 using the predetermined IP address. The gateway device 10 connects with the AFTR server 50 using the predetermined IP address that the gateway device 10 retrieved from the memory of the gateway device 10, and sends a request to establish the DS-lite tunnel ("setup DSlite tunnel") to the AFTR server 50. In response to the request, the gateway device 10 receives a reply ("setup DSlite tunnel response") from the AFTR server 50, and establishes the DS-lite tunnel between the gateway device 10 and the AFTR server 50.

In this manner, the gateway device 10 according to some example embodiments of inventive concepts disclosed herein can provide the client devices 20 (e.g., user devices with IPv4 addresses only) with access to an external network (the Internet), via the DS-lite tunnel that has been established between the gateway device 10 and the AFTR server 50, even in the event of a failed DNS query by using a predetermined IP address that is stored in the memory of the gateway device 10.

Next, a process for maintaining the DS-lite tunnel that has been established between the gateway device 10 and the AFTR server 50, including details regarding the subsequent DNS query (mentioned above in connection with step S170), will be discussed with reference to FIG. 4.

Figure 4:
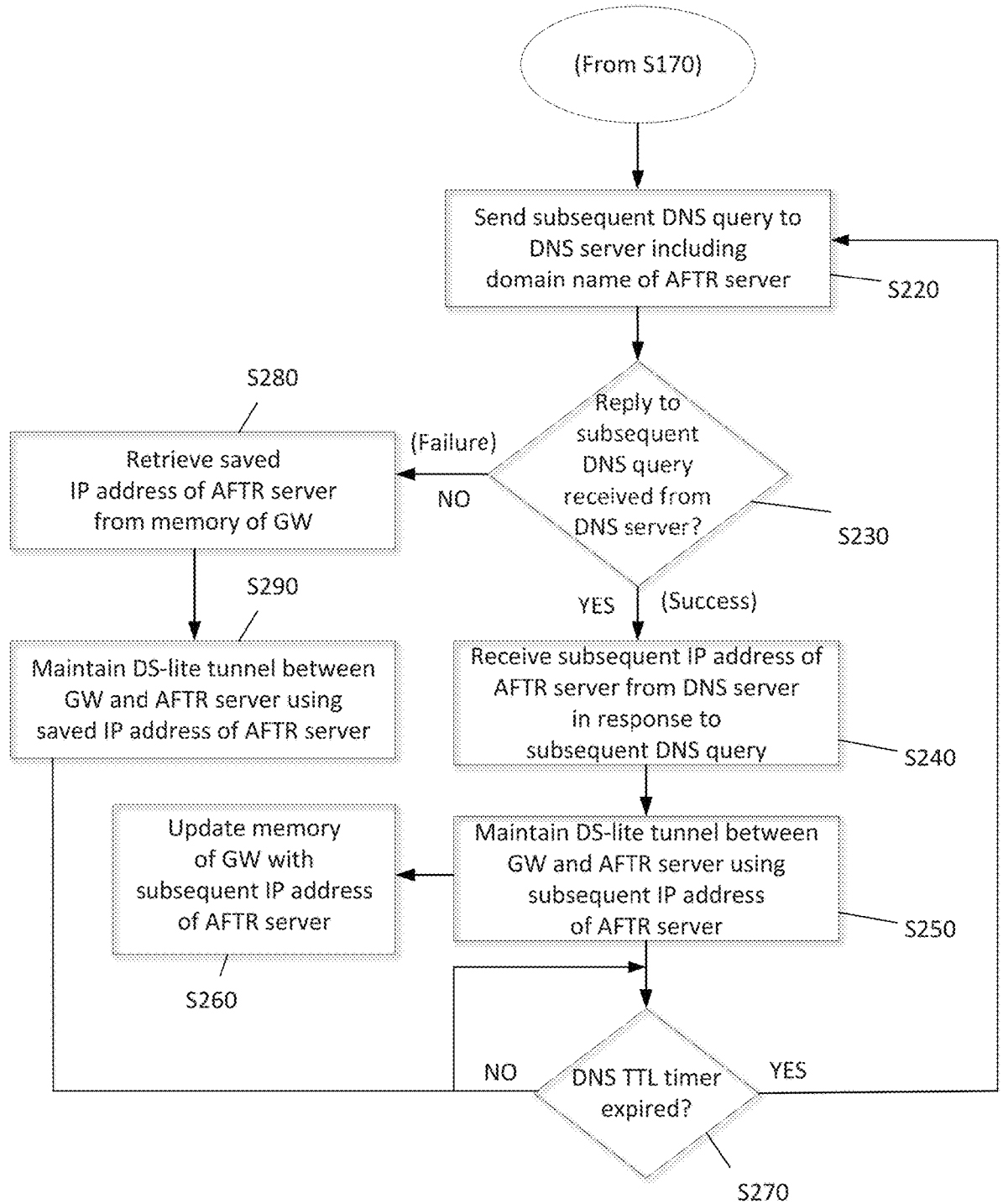
FIG. 4 is a flow chart of a method for maintaining a DS-lite tunnel between a gateway device and an AFTR server, according to some example embodiments.

FIG. 4 is a flow chart of a method for maintaining a DS-lite tunnel between a gateway device and an AFTR server, according to some example embodiments.

The method of FIG. 4 may be performed by the gateway device 10 of FIG. 1, for example. The gateway device 10 may include processing circuitry for implementing the algorithm for maintaining the DS-lite tunnel between the gateway device 10 and the AFTR server 50. For example, the gateway device 10 may include a memory device storing software in the form of computer-readable instructions and a processor configured to execute the software. The gateway device 10 may also store data (e.g., IP addresses) in the memory device or in a separate memory, for use during the process. Thus, the gateway device 10 may include a combination of hardware and software programmed to maintain the DS-lite tunnel.

After a DNS TTL timer expires ("YES" at S170 in FIG. 3, for example), a method for maintaining the DS-lite tunnel between the gateway device 10 and the AFTR server 50 may proceed to step S220 of FIG. 4, according to some example embodiments. At step S220, the gateway device 10 sends a subsequent DNS query to the DNS server 40, including the domain name of the AFTR server 50 and a request for a subsequent IP address of the AFTR server 50.

At step S230, the gateway device 10 determines whether a reply to the subsequent DNS query was received from the DNS server 40. If a reply to the subsequent DNS query ("DNS response") was received from the DNS server 40 ("YES" at step S230), the subsequent DNS query was successful, and the method proceeds to step S240.

At step S240, the gateway device 10 receives the subsequent IP address of the AFTR server 50, which is included in the reply to the subsequent DNS query ("DNS response") that the gateway device 10 received from the DNS server 40.

At step S250, the gateway device 10 maintains the DS-lite tunnel between the gateway device 10 and the AFTR server 50 using the subsequent IP address of the AFTR server 50 that the gateway device 10 received from the DNS server 40 (at step S240).

As discussed above, the gateway device 10 can then continue to provide the client devices 20 (e.g., user devices with IPv4 addresses only) with access to an external network (the Internet), via the DS-lite tunnel that has been maintained between the gateway device 10 and the AFTR server 50 using the subsequent IP address of the AFTR server 50.

According to some example embodiments, the gateway device 10 updates the memory of the gateway device 10 with the subsequent IP address of the AFTR server 50, at step S260.

Again, the gateway device 10 may continue to maintain the DS-lite tunnel with the AFTR server 50, if still needed. For example, the gateway device 10 may periodically send additional subsequent DNS queries for additional subsequent IP addresses of the AFTR server 50 to the DNS server 40, based on the DNS TTL timer. At step S270, the gateway device 10 determines whether the DNS TTL timer has elapsed ("DNS TTL timer expired?"). If the DNS TTL timer has not yet elapsed ("NO" at step S270), then the method returns to step S270 (e.g., after some delay or the like). If the DNS TTL timer has elapsed, then the method returns to step S220 to send an additional subsequent DNS query to the DNS server 40. This process may continue (e.g., repeat at periodic intervals) for as long as the gateway device 10 needs to maintain the DS-lite tunnel with the AFTR server 50.

Now referring back to step S230, if the gateway device 10 determines that a reply to the subsequent DNS query ("DNS response") was not received from the DNS server 40 ("NO" at step S230), then the subsequent DNS query failed. As discussed above, the related method performed by the known gateway device would ordinarily end at this point, without maintaining the DS-lite tunnel in the event of failure of the subsequent DNS query (e.g., "IPv4 datapath fail"), and the client devices having only IPv4 addresses would lose access to the Internet. However, in the event that the gateway device 10 according to some example embodiments does not receive a reply to the subsequent DNS query from the DNS server 40, then the method according to some example embodiments of inventive concepts disclosed herein does not end, and instead proceeds to step S280.

At step S280, the gateway device 10 retrieves a saved IP address of the AFTR server 50 from the memory of the gateway device 10. For example, the gateway device 10 may have stored an IP address of the AFTR server 50 in the memory of the gateway device 10 in response to a previous successful DNS query (e.g., at step S160 of FIG. 3), according to some example embodiments.

At step S290, the gateway device 10 maintains the DS-lite tunnel between the gateway device 10 and the AFTR server 50 using the saved IP address of the AFTR server 50, according to some example embodiments.

In this manner, the gateway device 10 according to some example embodiments of inventive concepts disclosed herein can continue to provide the client devices 20 (e.g., user devices with IPv4 addresses only) with access to an external network (the Internet), via the DS-lite tunnel that has been maintained between the gateway device 10 and the AFTR server 50, even in the event of a failed subsequent DNS query by using a saved IP address that is stored in the memory of the gateway device 10 in response to a previous successful DNS query.

Figure 5:
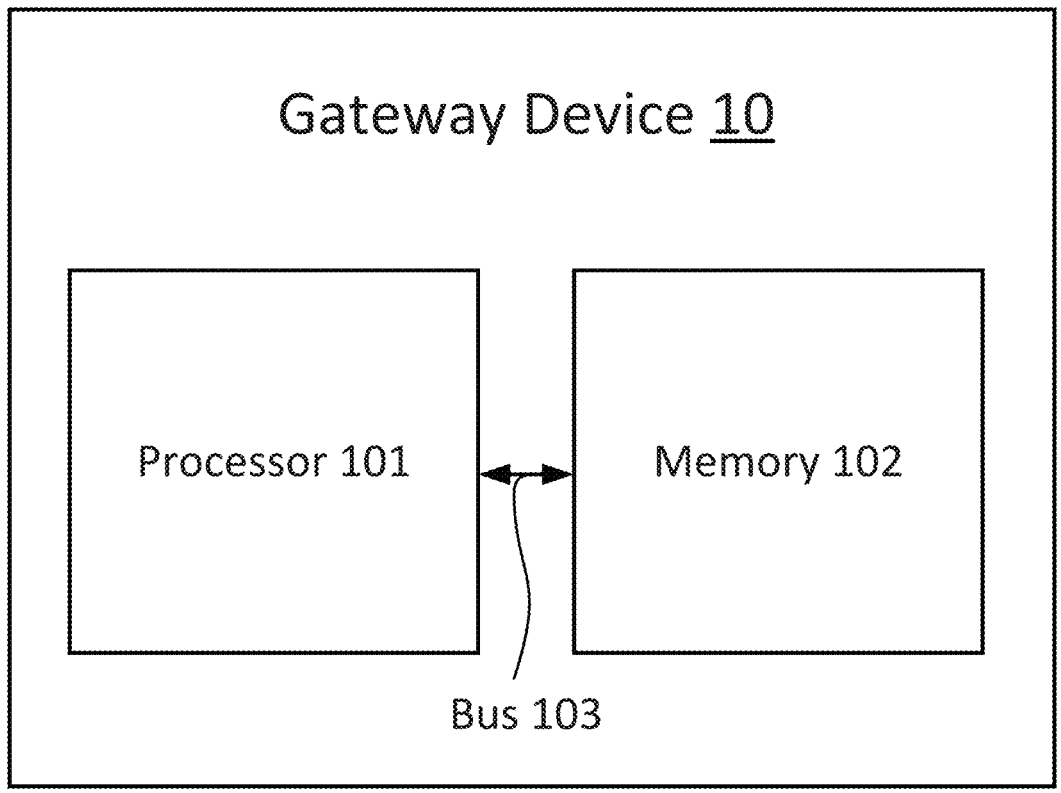
FIG. 5 is block diagram of an electronic apparatus for establishing and maintaining a DS-lite tunnel, according to some example embodiments.

FIG. 5 is block diagram of an electronic apparatus for establishing and maintaining a DS-lite tunnel, according to some example embodiments. For example, the electronic apparatus may be a gateway device 10 described above in connection with FIG. 1, and may perform the methods described above in connection with FIGS. 2-4.

As shown in FIG. 5, the gateway device 10 includes at least a processor 101, a memory 102, and a bus 103, among various other electronic components (e.g., for enabling wired and/or wireless communication) which are not illustrated for simplicity.

The processor 101 controls the general operations of the gateway device 10 and may include, but is not limited to, a central processing unit (CPU), dedicated control circuitry, a hardware microprocessor, a multi-core processor, a single core processor, a field programmable gate array (FPGA), a microcontroller, an integrated circuit (IC), an application specific integrated circuit (ASIC), a large scale integrated circuit (LSI), system LSI, super LSU or ultra LSI components, a digital signal processor (DSP), or other similar processing device capable of executing any type of instructions, algorithms, programs, or software for controlling the circuitry and performing the above-described functions of the gateway device 10.

The memory 102 may be a non-transitory computer-readable medium that stores various programming code (e.g., software instructions) and data for implementing steps of an algorithm when executed by the processor 101. The memory 102 may include a single memory or multiple memories or memory locations that include, but are not limited to, a random access memory (RAM), dynamic random access memory (DRAM), a memory buffer, a hard drive, a database, an erasable programmable read only memory (EEPROM), a read only memory (ROM) a flash memory, logic blocks of a field programmable gate array (FPGA), hard disk or any other various layers of memory hierarchy. The memory 102 can be used to store any type of software instructions including a program associated with algorithms, processes, or operations for controlling the general functions and operation of the gateway device 10 and performing the method of establishing and maintaining the DS-lite tunnel for the client devices 20. For example, the memory 102 can include RAM as a working memory for the processor 101 and/or a non-volatile memory provided for storage of program code, software, apps, device information, user data, and various other pieces of data associated with establishing and maintaining a DS-lite tunnel in a network.

The bus 103 is an internal connection that enables communication between various electronic components of the gateway device 10. For example, the processor 101 may store and retrieve program instructions and/or data for performing steps of the algorithm from the memory 102 via the bus 103.

In summary, the above-described method and apparatus according to various example embodiments of inventive concepts disclosed herein make it possible to establish and maintain a DS-lite tunnel between a gateway device and an AFTR server, even in the event of a failure of a DNS query or a subsequent DNS query, using mechanism that employs a predetermined IP address or a saved IP address of the AFTR server that is stored in a memory of the gateway device in order to ensure that the DS-lite technology keeps working when a DNS query fails. These features amount to technological improvements over a known gateway device and related method for at least the reasons discussed in detail above.

Each of the elements of the present invention may be configured by implementing dedicated hardware or a software program on a memory controlling a processor to perform the functions of any of the components or combinations thereof. Any of the components may be implemented as a CPU or other processor reading and executing a software program from a recording medium such as a hard disk or a semiconductor memory, for example. The processes disclosed above constitute examples of algorithms that can be affected by software, applications (apps, or mobile apps), or computer programs. The software, applications, computer programs or algorithms can be stored on a non-transitory computer-readable medium for instructing a computer, such as a processor in an electronic apparatus, to execute the methods or algorithms described herein and shown in the drawing figures (FIGS. 2-4). The software and computer programs, which can also be referred to as programs, applications, components, or code, include machine instructions for a programmable processor, and can be implemented in a high-level procedural language, an object-oriented programming language, a functional programming language, a logical programming language, or an assembly language or machine language.

The term "non-transitory computer-readable medium" refers to any computer program product, apparatus or device, such as a magnetic disk, optical disk, solid-state storage device (SSD), memory, and programmable logic devices (PLDs), used to provide machine instructions or data to a programmable data processor, including a computer-readable medium that receives machine instructions as a computer-readable signal. By way of example, a computer-readable medium can comprise DRAM, RAM, ROM, EEPROM, CD-ROM or other optical disk storage, magnetic disk storage or other magnetic storage devices, or any other medium that can be used to carry or store desired computer-readable program code in the form of instructions or data structures and that can be accessed by a general-purpose or special-purpose computer, or a general-purpose or special-purpose processor. Disk or disc, as used herein, includes compact disc (CD), laser disc, optical disc, digital versatile disc (DVD), floppy disk and Blu-ray disc. Combinations of the above are also included within the scope of computer-readable media.

While the principles of the inventive concepts have been described above in connection with specific devices, apparatuses, systems, algorithms, programs and/or methods, it is to be clearly understood that this description is made only by way of example and not as limitation. One of ordinary skill in the art will appreciate that various modifications and changes can be made without departing from the scope of the claims below.

The word "comprise" or a derivative thereof, when used in a claim, is used in a nonexclusive sense that is not intended to exclude the presence of other elements or steps in a claimed structure or method. As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise. Use of the phrases "capable of," "configured to," or "operable to" in one or more embodiments refers to some apparatus, logic, hardware, and/or element designed in such a way to enable use thereof in a specified manner.

The above description illustrates various embodiments along with examples of how aspects of particular embodiments may be implemented and are presented to illustrate the flexibility and advantages of particular embodiments as defined by the following claims, and should not be deemed to be the only embodiments. One of ordinary skill in the art will appreciate that based on the above disclosure and the following claims, other arrangements, embodiments, implementations and equivalents may be employed without departing from the scope hereof as defined by the claims. It is contemplated that the implementation of the components and functions of the present disclosure can be done with any newly arising technology that may replace any of the above-implemented technologies. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What we claim is:
1. An electronic apparatus for establishing a Dual-Stack Lite (DS-lite) tunnel, the electronic apparatus comprising:
 a memory storing computer-readable instructions;
 a processor configured to execute the computer-readable instructions to:

send a request for an Internet Protocol (IP) address of a Domain Name System (DNS) server and a domain name of an Address Family Transition Router (AFTR) server to a Dynamic Host Configuration Protocol (DHCP) server using an IP address of the DHCP server;
receive the IP address of the DNS server and the domain name of the AFTR server from the DHCP server in response to the request;
send a DNS query to the DNS server using the IP address of the DNS server, wherein the DNS query includes the domain name of the AFTR server;
in response to the sending the DNS query, receiving a DNS response from the DNS server, wherein the receiving the DNS response means the DNS query was successful:
receive an IP address of the AFTR server from the DNS server; and
establish the DNS-lite tunnel between the electronic apparatus and the AFTR server using the IP address of the AFTR server; and
save the IP address of the AFTR server;
periodically transmit one or more subsequent DNS queries to the DNS server based on a DNS time to live (TTL) timer; and
in response to one of the one or more subsequent DNS queries being successful:
receive a subsequent IP address of the AFTR server from the DNS server;
maintain the DS-lite tunnel between the electronic apparatus and the AFTR server using the subsequent IP address of the AFTR server; and
update the IP address of the AFTR server with the subsequent IP address of the AFTR server.

2. The electronic apparatus of claim 1, wherein the processor is further configured to execute the computer-readable instructions to:
in response to failure of the DNS query, establish the DS-lite tunnel between the electronic apparatus and the AFTR server using a predetermined IP address,
wherein the predetermined IP address is stored in the memory based on one of:
a default configuration of the electronic apparatus;
an initial setting by a user of the electronic apparatus; or
a previous successful DNS query.

3. The electronic apparatus of claim 1, wherein the IP address of the AFTR server is saved in the memory of the electronic apparatus.

4. The electronic apparatus of claim 3, wherein the processor is further configured to execute the computer-readable instructions to:
maintain the DS-lite tunnel between the electronic apparatus and the AFTR server using the saved IP address of the AFTR server that is stored in the memory of the electronic apparatus in response to the DNS query being successful.

5. The electronic apparatus of claim 1, wherein the processor is further configured to execute the computer-readable instructions to:
determine that the DNS time to live (TTL) timer has elapsed.

6. The electronic apparatus of claim 1, wherein the processor is further configured to execute the computer-readable instructions to:
determine that the one of the one or more subsequent DNS queries is successful based on a reply to the one of the one or more subsequent DNS queries.

7. The electronic apparatus of claim 1, wherein the processor is further configured to execute the computer-readable instructions to:
in response to failure of one of the subsequent DNS queries.
retrieve the saved IP address or the subsequent IP address of the AFTR server that is stored in the memory of the electronic apparatus in response to the DNS query or one of the subsequent DNS queries being successful; and
maintain the DS-lite tunnel between the gateway device and the AFTR server using the retrieved IP address of the AFTR server.

8. A method for establishing a Dual-Stack Lite (DS-lite) tunnel, the method comprising:
sending a request for an Internet Protocol (IP) address of a Domain Name System (DNS) server and a domain name of an Address Family Transition Router (AFTR) server to a Dynamic Host Configuration Protocol (DHCP) server using an IP address of the DHCP server;
receiving the IP address of the DNS server and the domain name of the AFTR server from the DHCP server in response to the request;
sending a DNS query to the DNS server using the IP address of the DNS server, wherein the DNS query includes the domain name of the AFTR server;
in response to the sending the DNS query, receiving a DNS response from the DNS server, wherein the receiving the DNS response means the DNS query was successful:
receiving an IP address of the AFTR server from the DNS server; and
establishing the DS-lite tunnel between the gateway device and the AFTR server using the IP address of the AFTR server; and
save the IP address of the AFTR server;
periodically transmit one or more subsequent DNS queries to the DNS server based on a DNS time to live (TTL) timer; and
in response to one of the one or more subsequent DNS queries being successful:
receive a subsequent IP address of the AFTR server from the DNS server;
maintain the DS-lite tunnel between the electronic apparatus and the AFTR server using the subsequent IP address of the AFTR server; and
update the IP address of the AFTR server with the subsequent IP address of the AFTR server.

9. The method of claim 8, further comprising:
in response to failure of the DNS query, establishing the DS-lite tunnel between the gateway device and the AFTR server using a predetermined IP address that is stored in a memory of the gateway device,
wherein the predetermined IP address is stored in the memory of the gateway device based on one of:
a default configuration of the gateway device;
an initial setting by a user of the gateway device; or
a previous successful DNS query.

10. The method of claim 8, wherein the IP address of the AFTR server is saved in a memory of the gateway device.

11. The method of claim 10, further comprising:
maintaining the DS-lite tunnel between the gateway device and the AFTR server using the saved IP address of the AFTR server that is stored in the memory of the gateway device in response to the DNS query being successful.

12. The method of claim 8, further comprising:
determine that the DNS time to live (TTL) timer has elapsed.

13. The method of claim 8, further comprising:
in response to one of the subsequent DNS queries being successful:
  receiving a subsequent IP address of the AFTR server from the DNS server;
  maintaining the DS-lite tunnel between the gateway device and the AFTR server using the subsequent IP address of the AFTR server; and
  updating the memory of the gateway device with the subsequent IP address of the AFTR server.

14. The method of claim 8, further comprising:
in response to failure of one of the subsequent DNS queries:
  retrieving the saved IP address of the AFTR server that is stored in the memory of the gateway device in response to the DNS query being successful; and
  maintaining the DS-lite tunnel between the gateway device and the AFTR server using the saved IP address of the AFTR server.

15. A non-transitory computer-readable medium of an electronic apparatus storing one or more computer-readable instructions for establishing a Dual-Stack Lite (DS-lite) tunnel, that when executed by a processor of the electronic apparatus, cause the processor to perform one or more operations comprising:
  send a request for an Internet Protocol (IP) address of a Domain Name System (DNS) server and a domain name of an Address Family Transition Router (AFTR) server to a Dynamic Host Configuration Protocol (DHCP) server using an IP address of the DHCP server;
  receive the IP address of the DNS server and the domain name of the AFTR server from the DHCP server in response to the request;
  send a DNS query to a DNS server using the IP address of the DNS server, wherein the DNS query includes the domain name of the AFTR server; and
  in response to the sending the DNS query, receiving a DNS response from the DNS server, wherein the receiving the DNS response means the DNS query was successful:
    receive an IP address of the AFTR server from the DNS server;
    establish the DS-lite tunnel between the electronic apparatus and the AFTR server using the IP address of the AFTR server; and
    save the IP address of the AFTR server;
  periodically transmit one or more subsequent DNS queries to the DNS server based on a DNS time to live (TTL) timer; and
  in response to one of the one or more subsequent DNS queries being successful:
    receive a subsequent IP address of the AFTR server from the DNS server,
    maintain the DS-lite tunnel between the electronic apparatus and the AFTR server using the subsequent IP address of the AFTR server; and
    update the IP address of the AFTR server with the subsequent IP address of the AFTR server.

16. The computer-readable medium of claim 15, wherein the software program, when executed by the processor of the electronic apparatus, further causes the electronic apparatus to:
  in response to failure of the DNS query, establish the DS-lite tunnel between the electronic apparatus and the AFTR server using a predetermined IP address that is stored in a memory of the electronic apparatus based on one of:
    a default configuration of the electronic apparatus;
    an initial setting by a user of the electronic apparatus; or
    a previous successful DNS query.

17. The computer-readable medium of claim 15, wherein the IP address of the AFTR server is saved in a memory of the electronic apparatus.

18. The computer-readable medium of claim 15, wherein the software program, when executed by the processor of the electronic apparatus, further causes the electronic apparatus to at least one of:
  maintain the DS-lite tunnel between the electronic apparatus and the AFTR server using the saved IP address of the AFTR server in response to the DNS query being successful; and
  determine that the one of the one or more subsequent DNS queries is successful based on a reply to the one of the one or more subsequent DNS queries.

19. The computer-readable medium of claim 15, wherein the software program, when executed by the processor of the electronic apparatus, further causes the electronic apparatus to:
  determine that the DNS time to live (TTL) timer has elapsed.

20. The computer-readable medium of claim 15, wherein the software program, when executed by the processor of the electronic apparatus, further causes the electronic apparatus to:
  in response to failure of one of the subsequent DNS queries:
    retrieve the saved IP address of the AFTR server that is stored in the memory of the electronic apparatus in response to the DNS query being successful; and
    maintain the DS-lite tunnel between the electronic apparatus and the AFTR server using the saved IP address of the AFTR server.

* * * * *